Oct. 28, 1952     F. P. VACHA     2,615,704
CENTRIFUGAL SPRING SUPPORT TYPE SPEED RESPONSIVE DEVICE

Original Filed April 7, 1945     2 SHEETS—SHEET 1

Inventor
Fred P. Vacha
by Martin J. Finnegan
ATTORNEY

Oct. 28, 1952          F. P. VACHA          2,615,704
CENTRIFUGAL SPRING SUPPORT TYPE SPEED RESPONSIVE DEVICE
Original Filed April 7, 1945          2 SHEETS—SHEET 2
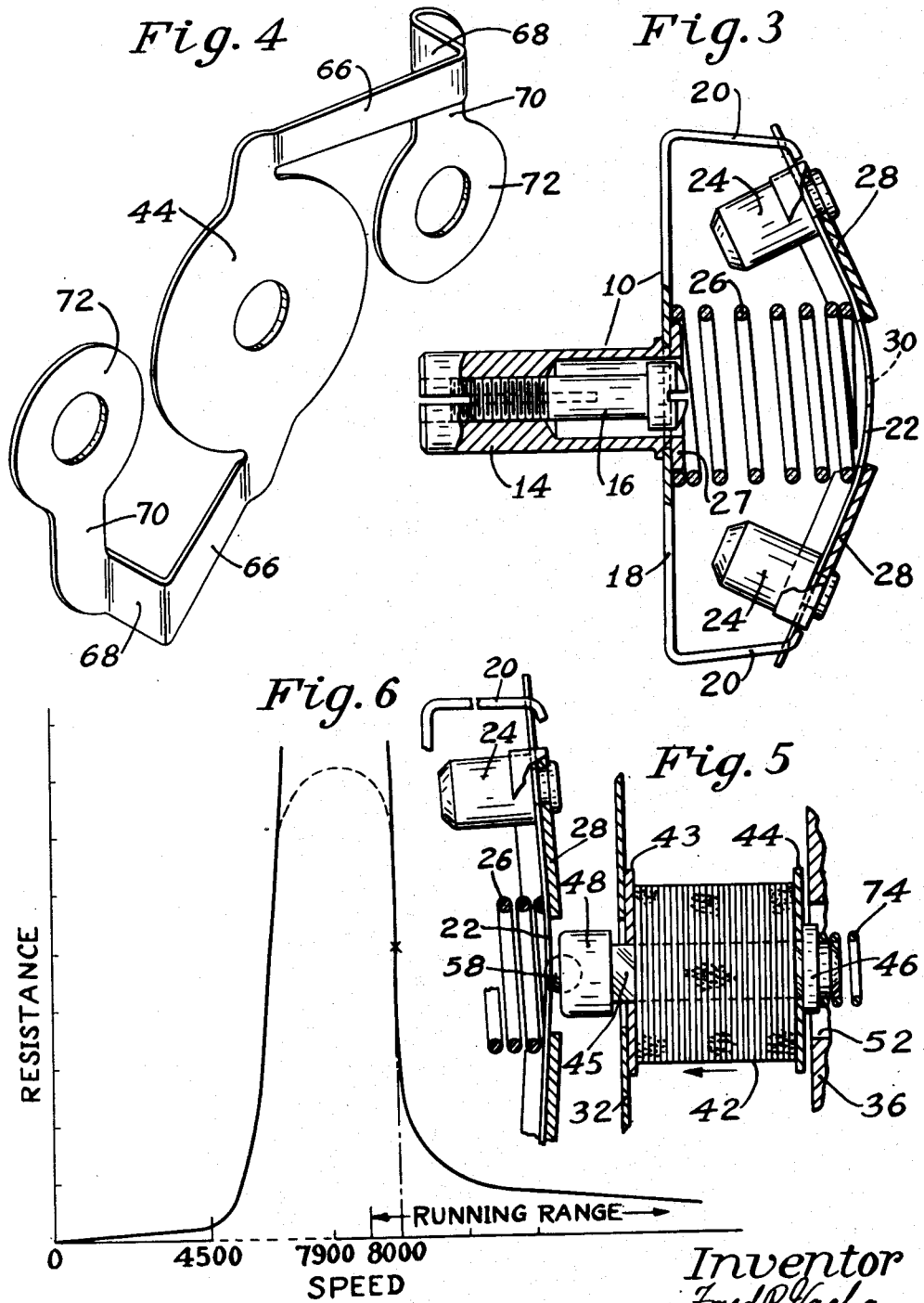

Patented Oct. 28, 1952

2,615,704

UNITED STATES PATENT OFFICE 2,615,704

CENTRIFUGAL SPRING SUPPORT TYPE SPEED RESPONSIVE DEVICE

Fred P. Vacha, Auburndale, Mass., assignor, by mesne assignments, to National Pneumatic Co., Inc., Boston, Mass., a corporation of Delaware Original application April 7, 1945, Serial No. 587,103. Divided and this application September 3, 1948, Serial No. 47,658

1 Claim. (Cl. 264—18)

The present invention relates to speed controllers, and more particularly to centrifugal governors for electrical machines.

The usual centrifugal governor is of the contact type whereby contacts are opened and closed on slight variations from rated speed, and operating, in the case of direct current motors, to cut resistance into and out of the shunt field. Governors of this type have proved satisfactory for many purposes, but they are open to the objection that the control is not smooth and the motor continually hunts between two speeds above and below regulated speed. Furthermore, when used with inverters for converting D. C. into A. C., the abrupt variations in field current modulate the A. C. output. This modulation of A. C. output is highly objectionable in certain services, as for example, in aircraft use.

The object of the present invention is to provide a speed governor which will provide a smooth, continuous control without abrupt modulation of the output.

Figure 1:
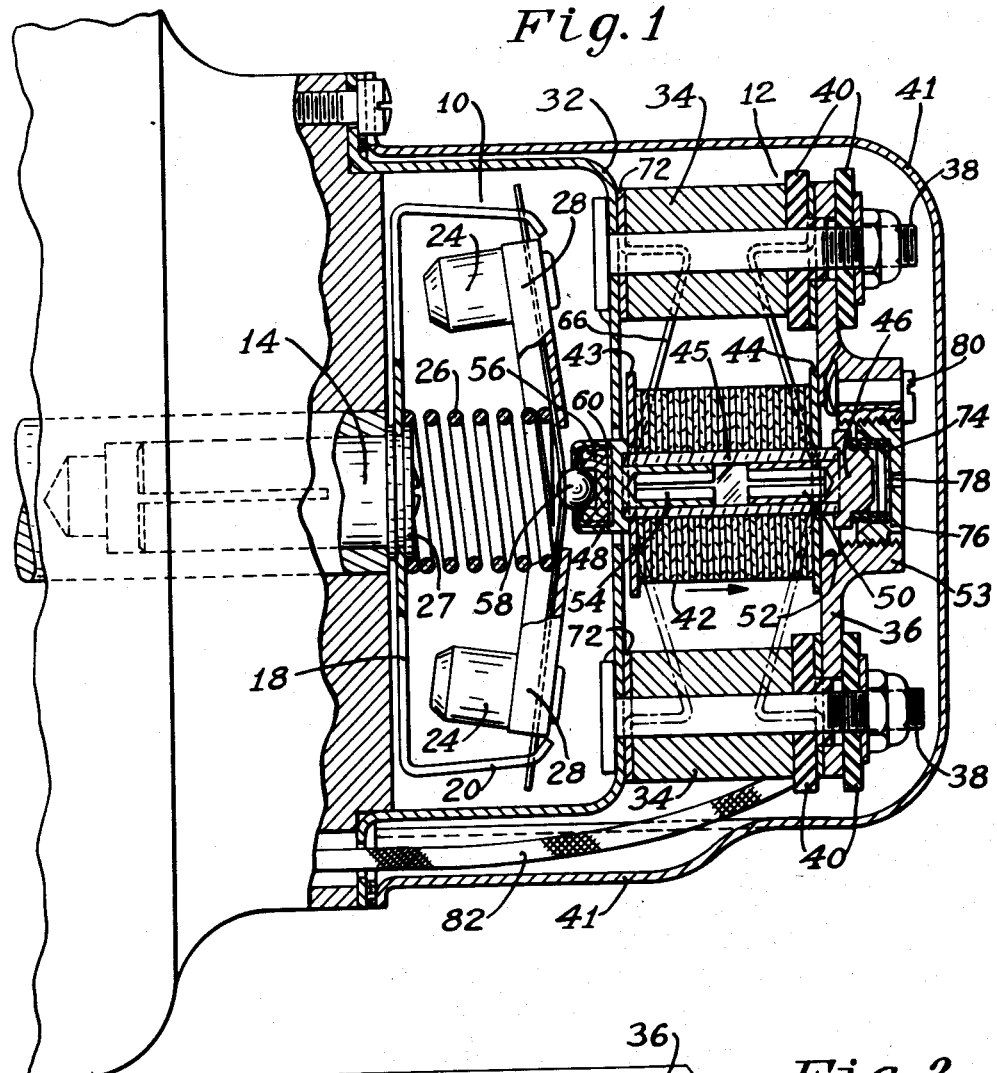
Figure 2:
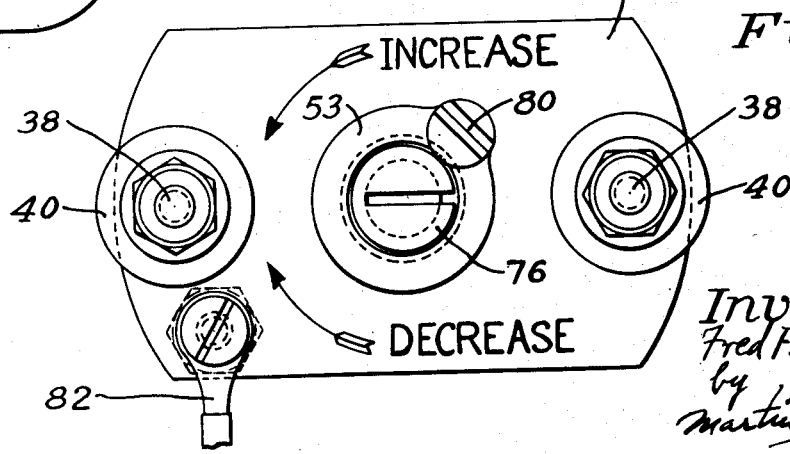

In the accompanying drawings, Fig. 1 is a sectional plan view of the preferred governor; Fig. 2 is an end elevation of the stationary unit; Fig. 3 is an elevation of the rotating unit; Fig. 4 is a detail view of one of the floating contacts, Fig. 5 is a detail view illustrating the unit in the running range; and Fig. 6 is a graph illustrating the operation of the governor.

The invention is herein described as applied to an inverter for converting D. C. to A. C., although it may be used as a speed control in connection with any electrical machine in which the speed may be varied by a variation in resistance.

The preferred form of the invention comprises two units, namely a rotary unit indicated generally at 10 and connected with the inverter shaft, and a stationary unit indicated generally at 12 and mounted in fixed position in the frame of the machine.

The rotating unit, as shown in Fig. 3, comprises a stud 14 to be attached to the machine shaft in any convenient manner. Preferably the stud 14 is an expansible member which is inserted into a hole in the end of the inverter shaft, being held in place by an expanding screw 16. Secured to the stud 14 is a frame 18 with resilient side arms 20 arranged to receive the ends of a bowed flat spring 22 to which are riveted the weights 24. A coil spring 26 bears between the base of the frame and the middle of the spring 22. The spring is maintained in centered position surrounding a cylindrical boss 27 on the base of the frame. Wing members 28 for a purpose to be explained later, are attached to the spring 22, preferably by the same rivets which hold the weights 24. The center of the flat spring is provided with an opening 30.

The stationary unit 12 comprises a cup 32 on which are mounted two metal posts 34 carrying at the outer end a plate 36. As shown in Fig. 1, the posts 34 and plate 36 are held in position by bolts 38, the plate being insulated from the bolts and posts by suitable insulating members indicated at 40. The entire assembly may be enclosed within a cover 41.

When the device is assembled, as shown in Fig. 1, the springs 22 and 26 of the rotating member are considerably compressed, thereby pressing against the ball 58. At standstill, the force due to these springs overcomes the force of the spring 74, so that the entire carbon pile unit is forced to the right, as shown in Fig. 1. The ball-thrust member 48 bears against the floating member 43, and the member 44 is pressed against the plate 36. The carbon disks are under high compression so that the resistance is a minimum. Consequently, a high field current is available at starting.

As the machine is started, the forces due to rotation of the weights act in a manner to straighten the spring member 22, thus diminishing the spring pressure against the ball 58. The member 48 moves toward the left. At some speed below the running range, the floating contact member 43 bottoms against the cup 32 and the member 48 leaves engagement therewith. At this time, the spring forces due to the rotating member and the spring 74 act only on the tube 45 and are ineffective to apply any compression to the pile. The pile may or may not be then under compression, depending on the setting of the floating contact disk 44 in relation to its arms 66, 68. It has been previously stated that the arms may be adjusted in a manner to urge the disk 44 either toward or away from the plate 36. If the disk is urged toward the plate 36, then at this time the pile will be under no compression and the resistance will be very high, practically infinite. The diminution of field current caused by the presence of this high resistance in the field circuit accelerates the speed-up of the machine. It will be noted that the space taken by the pile and floating members is slightly less than the space between the cup 32 and the plate 36, which constitute the end supports for the pile, whereby a small "lost motion" is provided. The setting of the disk 44 to provide a substantially infinite resistance is satisfactory in machines having a light series field, thus assuring rapid acceleration in the intermediate range.

For larger units, it may be necessary to maintain some shunt field current in order that the torque will not be too greatly reduced. To this end the disk 44 is set to be urged by its spring arms 66, 68 away from the plate 36, that is, toward the pile, so that it applies some compression to the pile even when the other springs apply no compression thereto. The compression thus applied to the pile by the disk 44, in this intermediate range is less than that applied by the other springs of the unit in the starting or running range. The amount of compression, and hence the maximum resistance in the intermediate range, may obviously be adjusted by the pressure applied by the floating contact disk 44.

In any case, as the speed further increases the force due to the rotating member further diminishes. Under the action of spring 76 the plug 46 then engages the floating disc 44, as shown in Fig. 5, and the pile is again subjected to strong compression between the floating member 44 and the now stationary member 43. The control is now in the running range, wherein the disks are variably compressed in dependence on speed. If the speed increases above the regulated value, the disks are compressed further to increase the field current, and if speed is reduced, the compression is relaxed to decrease the field current, whereby the inverter speed is quickly restored to the desired value.

It will be seen that in the starting range the pile is compressed toward the right and in the running range it is compressed toward the left, while the lost motion provides an intermediate condition of zero (or minimum) compression to accelerate the speeding up of the machine. Between starting and running conditions, the pile is shifted bodily from one position (Fig. 1) to the other (Fig. 5).

A graph illustrating typical operation is given in Fig. 6. This is for an inverter having a rated speed of 8000 R. P. M. At standstill the resistance of the pile is 0.20 ohm. At 4500 R. P. M. the resistance has increased to 0.50 ohm. Above 4500 R. P. M. the resistance increases rapidly. If zero compression is applied in the intermediate range, the resistance rises toward infinity, as indicated by the solid line. If some compression is maintained in the intermediate range, the intermediate range is as illustrated generally by the dotted portion of the curve. The running range is indicated as beginning at about 7980. At the desired speed of 8000, the resistance may be about 20 ohms; the curve is there very steep, so that a sensitive control of speed is readily obtained.

The regulated speed may be adjusted by varying the compression of the spring 74, which is easily accomplished by adjusting the screw 76.

The construction of the rotating unit is of importance. The spring forces of the rotary unit are made up of the forces due to the resilient arms 20 of the frame, the flexure of the flat spring 22 and the force due to the coil spring 26. The coil spring is desirable because the large force required for compression of the pile could not be provided by a flat spring of convenient size. The wing members 28 are used to flex the flat spring 22 and compress the coil spring 26; they prevent any tendency of the flat spring to buckle.

The rotary unit is preferably so adjusted that at the regulated speed, the spring 22 is nearly straight but slightly bowed outwardly as shown in Fig. 5. In this position the forces due to the arms 20 and the flat spring 22 are relatively weak as compared with the corresponding forces under the starting condition (Fig. 1) when the spring 22 is bowed outwardly to a greater extent. Thus in the running range, a "soft" and sensitive spring action is provided.

This application is a division of my application No. 587,103, filed April 7, 1945, now Patent No. 2,460,246.

Having thus described the invention, I claim:

A rotary unit for a centrifugal governor comprising a frame having yielding arms, a flat spring member supported between the arms and bowed outwardly under inactive conditions, centrifugal weights on the spring, a coil spring between the frame and the center of the flat spring, and plate members secured to the flat spring in the vicinity of the weights and having contact with the flat spring along the major portion of its length so that outward movement of the weights as the speed increases causes said plate members to press more firmly against said flat spring to tend to reduce the degree of bowing of said flat spring and at the same time apply additional compressive force to said coil spring, the flat spring being arranged to bow only slightly at speeds near the running speed, whereby a soft spring action in the running range and a strong spring action at standstill are obtained.

FRED P. VACHA.

REFERENCES CITED

The following references are of record in the file of this patent:

UNITED STATES PATENTS

| Number | Name | Date |
| --- | --- | --- |
| 331,517 | McCarty | Dec. 1, 1885 |
| 1,082,225 | Deardorff | Dec. 23, 1913 |
| 1,432,927 | Tomlinson | Oct. 24, 1922 |
| 2,416,973 | Wright | Mar. 4, 1947 |